US012524323B2

(12) United States Patent
Zhang et al.

(10) Patent No.: US 12,524,323 B2
(45) Date of Patent: Jan. 13, 2026

(54) PHYSICAL-AWARE POWER PROFILE OPTIMIZATION DURING MEMORY TEST

(71) Applicant: NXP USA, Inc., Austin, TX (US)

(72) Inventors: Ke Zhang, Dripping Springs, TX (US); Henning Fritz Spruth, Austin, TX (US); Qadeer Qureshi, Dripping Springs, TX (US); Christopher Michael Falk, Dripping Springs, TX (US); Rajesh Padinzhara Rajan, Austin, TX (US)

(73) Assignee: NXP USA, Inc., Austin, TX (US)

( * ) Notice: Subject to any disclaimer, the term of this patent is extended or adjusted under 35 U.S.C. 154(b) by 0 days.

(21) Appl. No.: 18/659,207

(22) Filed: May 9, 2024

(65) Prior Publication Data
US 2025/0348395 A1 Nov. 13, 2025

(51) Int. Cl.
G06F 11/27 (2006.01)
(52) U.S. Cl.
CPC .................... G06F 11/27 (2013.01)
(58) Field of Classification Search
CPC ....................................... G06F 11/27
See application file for complete search history.

(56) References Cited

U.S. PATENT DOCUMENTS

| 6,934,205 B1* | 8/2005 | Pandey ................... G06F 11/27 |
| | | 714/E11.169 |
| 7,478,176 B2 | 1/2009 | Zimmer et al. |
| 8,719,761 B2* | 5/2014 | Card ..................... G06F 30/327 |
| | | 716/135 |
| 8,918,750 B1 | 12/2014 | Moffitt |
| 2008/0320071 A1* | 12/2008 | Hoskins .............. G06F 11/3688 |
| | | 709/202 |
| 2014/0089875 A1 | 3/2014 | Arora et al. |
| 2019/0043601 A1* | 2/2019 | Tan .................. G11C 29/12015 |
| 2021/0375468 A1* | 12/2021 | Zhang .................. A61B 5/7267 |
| 2022/0300389 A1 | 9/2022 | Pandey et al. |
| 2023/0154521 A1* | 5/2023 | Kim .................. G11C 11/40611 |
| | | 365/222 |

OTHER PUBLICATIONS

Richard M Chou et al.: "Scheduling Tests for VLSI Systems Under Power Constraints", IEEE Transactions On Very Large Scale Integration (VLSI) Systems, IEEE Service Center, Piscataway, NJ, USA, vol. 5, No. 2, Jun. 1, 1997, pp. 175-185.

* cited by examiner

Primary Examiner — Kamini B Patel

(57) ABSTRACT

A method for physical-aware power profile optimization during memory test includes creating a plurality of scheduling buckets, wherein each scheduling bucket includes one or more sequentially executed test sequences, each test sequence controlled by a respective Built-In Self-Test (BIST) controller, each test sequence including a respective unoptimized start time and a respective execution time, and a respective combined duration of the execution times of each respective scheduling bucket being less than or equal to a test time budget. A power profile is optimized by determining a respective optimized start time of at least one test sequence from at least a physical distance between two groups of memories controlled by respective BIST controllers. The respective optimized start time is assigned to the at least one test sequence.

20 Claims, 8 Drawing Sheets

PHYSICAL-AWARE POWER PROFILE OPTIMIZATION DURING MEMORY TEST

FIELD

This disclosure relates generally to memory test, and more specifically to the sequencing of memory tests to reduce peak power and voltage supply perturbations due to excessive localized current demands.

BACKGROUND

Built-In Self-Test (BIST) circuits are frequently used to test System-on-Chip (SoC) designs with embedded memories. The embedded memories may be arranged in groups controlled by a single BIST circuit. Each memory may be controlled by the BIST in parallel or serial with respect to the other memories in the group. Memories that are run in parallel typically start execution at the same time, resulting in peak currents at the beginning of each test. The current consumption of the paralleled memories under test may drop after faster memories complete execution, while the slower memories continue to execute tests. Similarly, larger memories may require more time to complete a test than a smaller paralleled memory executing the same test at the same test frequency.

While testing memories in parallel may reduce the overall test time compared to serial testing, problems may arise from peak current induced voltage drops (e.g., "IR drop"). The IR drop issue may also result in potentially good dice being rejected or downgraded in speed due to an unrealistic operating scenario. Furthermore, additional power supplies may be required for the SoC tester, which increases test cost. Testing the SoC in the field may result in the same peak IR drop issue, when the embedded memories are tested in parallel.

BRIEF DESCRIPTION OF THE DRAWINGS

The present invention is illustrated by way of example and is not limited by the accompanying figures, in which like references indicate similar elements. Elements in the figures are illustrated for simplicity and clarity and have not necessarily been drawn to scale.

DETAILED DESCRIPTION

Embodiments described herein provide for optimizing the power profile of a device under test (e.g., an SoC), where the device includes BIST controllers with respective groups of memories. Optimization is performed by creating scheduling buckets having serially executed test sequences where each bucket will complete execution no later than the longest duration test sequence. Each bucket may be scheduled to start at the same time, however the serially executed test sequences of each bucket may be reordered based on the physical characteristics of all BIST controllers and their respective groups of memories.

Specifically groups of memories that execute in parallel and are physically proximate to each other are more likely to cause local current drop issues. Hence the test sequences for groups of memories which are physically close to another are given new start times that attempt to serialize the execution and thereby reduce the current demands on the supply or ground networks local to the respective groups of memories. Test sequences are reordered and optimized at a global level (e.g., for all groups of memories), to reduce local IR drops and overall peak current demands of all BIST controllers and respective groups of memories considered together.

Figure 1:
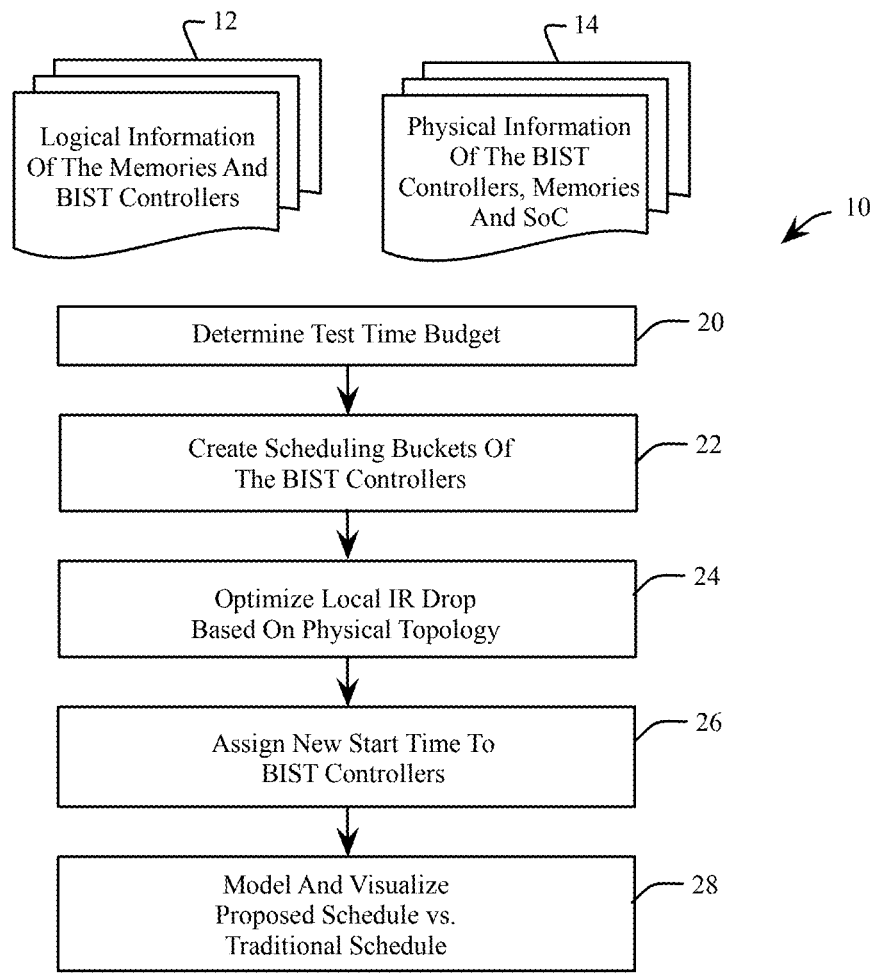
FIG. 1 is a flowchart representation of a method for physical-aware power profile optimization during memory test, in accordance with an embodiment of the present disclosure.

FIG. 1 shows an embodiment 10 of a method for physical-aware power profile optimization during memory test, in accordance with an embodiment of the present disclosure. The method 10 depends upon logical information (e.g., attributes) 12 of the groups of memories and respective BIST controller. The method 10 also depends upon physical information (e.g., attributes) 14 of the BIST Controllers, the groups of memories and the SoC (or device embodying the memories). The method 10 starts with determining 20 the test time budget, using one or more of the logical attributes 12 of the memories. In one embodiment, the test time of each memory from the group of memories is determined from the number of words, the word width, the read and write access time and the BIST algorithm being used (e.g., March C, Read Disturb, and the like). In one embodiment, the test time budget is determined from the test sequence having the longest execution time of all the test sequences controlled by the respective BIST controllers. In another embodiment, a longer test time budget may be defined by the user.

At 22, scheduling buckets of the BIST controllers are created. Scheduling buckets include one or more test sequences, arranged to execute serially so that the last test sequence of each bucket completes on or before the test time budget. In one embodiment, the initial sorting and arranging of the test sequences is determined by a bin packing algorithm. In one embodiment, the bin packing algorithm is implemented with a dynamic programming approach.

At 24, physical attributes from the physical information 14 are used to optimize local IR drop and to reduce overall peak power of the device embodying the groups of memories and respective BIST controllers. Optimization is achieved by reordering test sequences by determining optimized start times. In one embodiment, a greedy search algorithm is used to determine a global maximum of the physical separation of each group of memories executing a test sequence in parallel with another group of memories. In another embodiment, another algorithm is used to find the global optimal solution. To achieve a global maximum, in one example parallel execution of test sequences may be scheduled between two groups of memories that are physically closer to each other than prior to the optimization, while enabling parallel execution of two other groups of memories that are physically separated by a greater distance from each other than prior to the optimization. In one embodiment, physically larger memories require a larger increase in physical separation than smaller memories, to have the same effect on achieving the global maximum, due to the increased local current demands required by a larger memory.

At 26, the optimized start times of the test sequences are assigned to the respective BIST controllers. In one embodiment, at 28 an improvement to the power profile is modelled by comparing a distribution of memory accesses plotted over a time frame equal to the test time budget for all BIST controllers using the unoptimized start times and the optimized start times. The power profile using the optimized start times results in a more even distribution of the number of memory accesses over time compared to the unoptimized profile.

In one non-limiting example, the logical information 12 includes a type of memory based on the number of read and write ports, a number of words, a data width, an at-speed test frequency including read access and write access, an estimated power consumption of testing an individual memory and a set of memories, a module name and instance hierarchy, mapping information between the memories within the group of memories and the respective memory BIST controllers, and a configuration of the memory BIST controllers including the parallel and serial arrangement of each memory within the group of memories.

In one non-limiting example, the physical information 14 includes the physical die area of the SoC, the physical size of each memory including a width and height, a physical location and orientation of the instantiated memories, a physical location and orientation of the respective BIST controller and memory power information including energy consumed for each memory read or write access.

Figure 2:
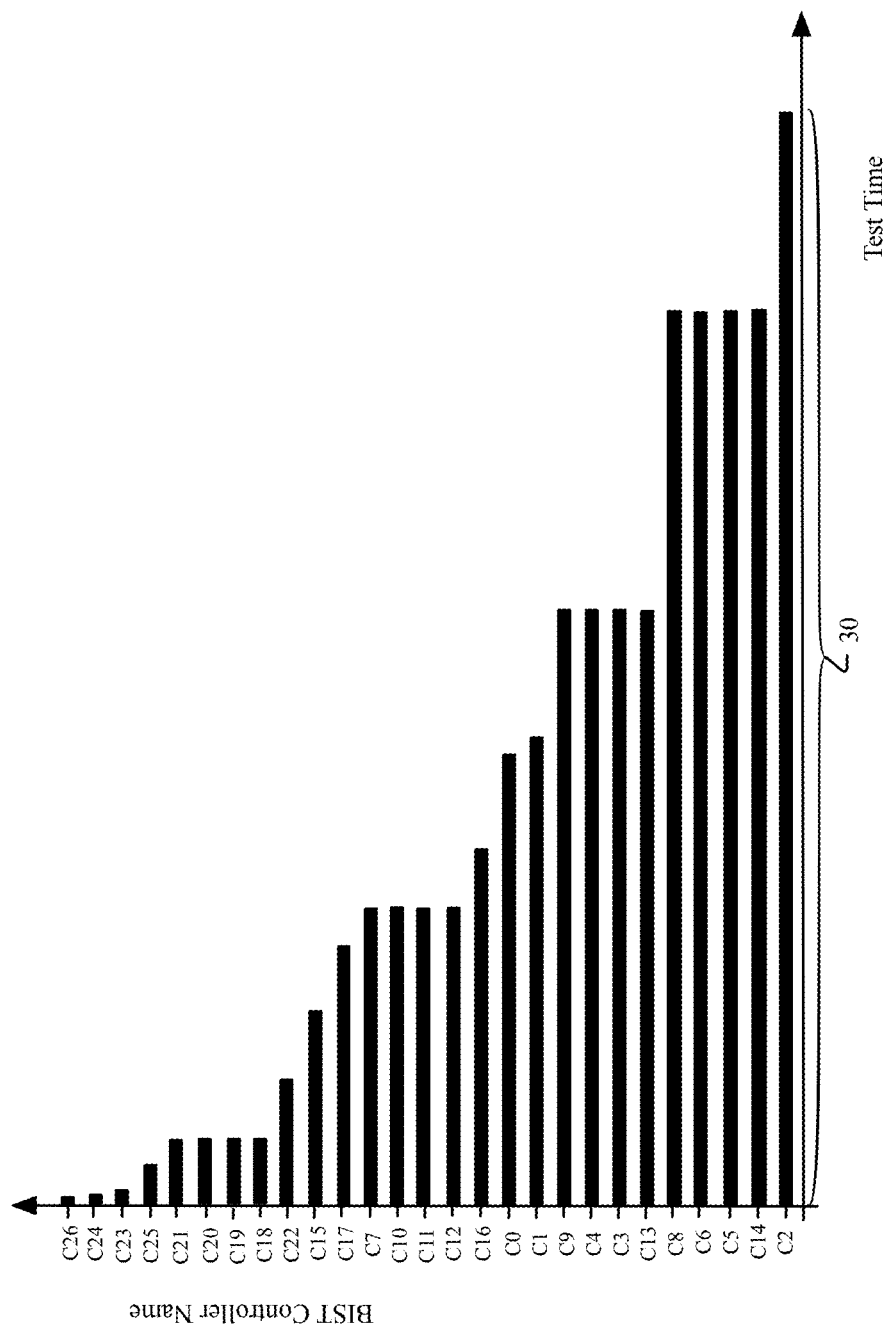
FIG. 2 is a graphical representation of various tests executed by memory Built-In Self-Test (BIST) controllers, sorted in ascending order of duration.

FIG. 2 with reference to step 20 of FIG. 1, shows various tests executed by a respective BIST controller (C0 though C26), sorted in ascending order of duration. The longest duration test sequence is shown as being executed by the BIST controller C2 with a duration being used to establish the test time budget 30.

Figure 3:
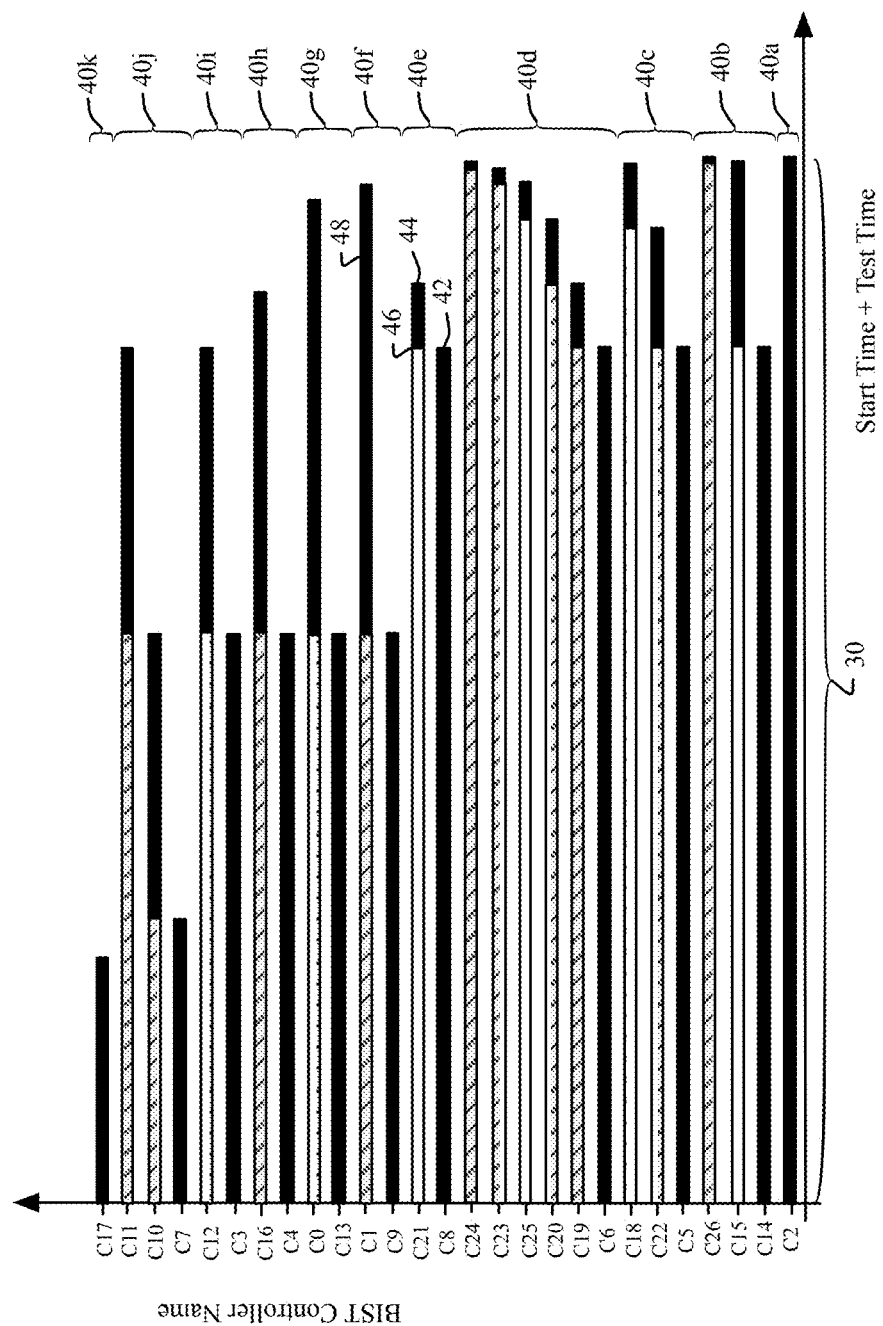
FIG. 3 is a graphical representation of the various tests of the BIST controllers of FIG. 2 grouped into test buckets, where the tests of each test bucket complete prior, or equal to, the longest test time shown in FIG. 1.

FIG. 3 with reference to step 22 of FIG. 1, shows the plurality of BIST controllers (C0 through C26) grouped into scheduling buckets 40a though 40k (generally 40). In one embodiment, the scheduling buckets are determined using a bin packing algorithm using a dynamic programming approach. Within each scheduling bucket 40, one or more test sequences are serially executed with a total completion time less than or equal to the test time budget 30. The scheduling bucket 40k only has one test sequence associated with a BIST C17 as a residual that could not fit into other existing buckets.

Specifically, a scheduling bucket 40e includes a test sequence 42 controlled by a BIST C8. The scheduling bucket 40e further includes a test sequence 44 executed by a BIST C21. The test sequence 44 is scheduled with a start time 46 beginning upon completion of the test sequence 42 and stay within the test time budget. The test sequences 42 and 44 are serially executed. In contrast, the test sequence 48 of the scheduling bucket 40f executes in parallel with the two test sequences 42 and 44 of the scheduling bucket 40c. The test sequence 48 is controlled by a BIST C1. In one example, although the test sequences of FIG. 3 are arranged to stay within the test time budget 30, parallel execution of the test sequence 48 with test sequences 42 or 44 may lead to IR drop issues if the BIST controller C1 is physically too close to the BIST controllers C8 or C21.

Figure 4:
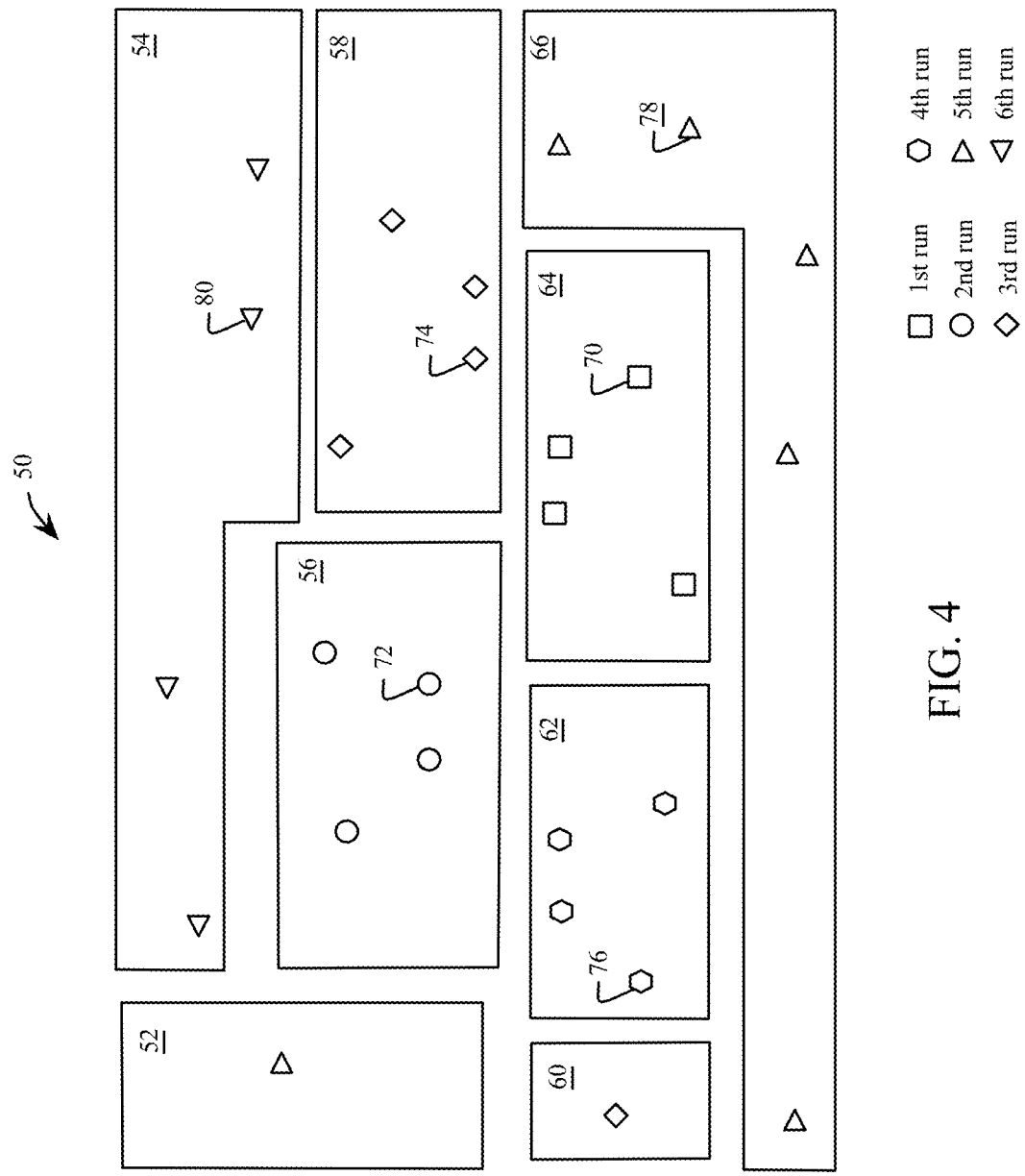
FIG. 4 is a schematic view of a physical layout of a semiconductor device showing the boundaries of sub-systems, each having nodes including groups of memories with an associated BIST controller.

FIG. 4 shows an embodiment 50 of an SoC (e.g., a semiconductor device) showing the boundaries of sub-systems 52, 54, 56, 58, 60, 62, 64 and 66. Each subsystem includes one or BIST controllers with respective memory groups. Each BIST controller may be assigned a start time based on a given test time budget (as also shown in FIG. 3). Specifically, the BIST (and respective group of memories) shown at 70 (encircled by a square box) may be scheduled to run first starting at time 0. Similarly, each of the BISTs (encircled by the square box) in the subsystem 64 may be scheduled to run first in each scheduling bucket 40. The BIST 72 in subsystem 56 may be scheduled to run second (and similarly with the other BISTs enclosed by a circle, in subsystem 56). The BIST 74 in subsystem 58, enclosed with a diamond shape may be scheduled to run third. The BIST 76 in subsystem 62, enclosed with the hexagon shape may run fourth. The BIST 78 in subsystem 66, enclosed with the triangle shape pointing to the right may run fifth. The BIST 80 in subsystem 64, enclosed with the triangle shape pointing to the left may run sixth. FIG. 4 represents an unoptimized scheduling of BIST controllers. For example, in subsystem 64, four BIST controllers are physically close and each scheduled to run in the first time slot (as shown by the square enclosure).

Figure 5:
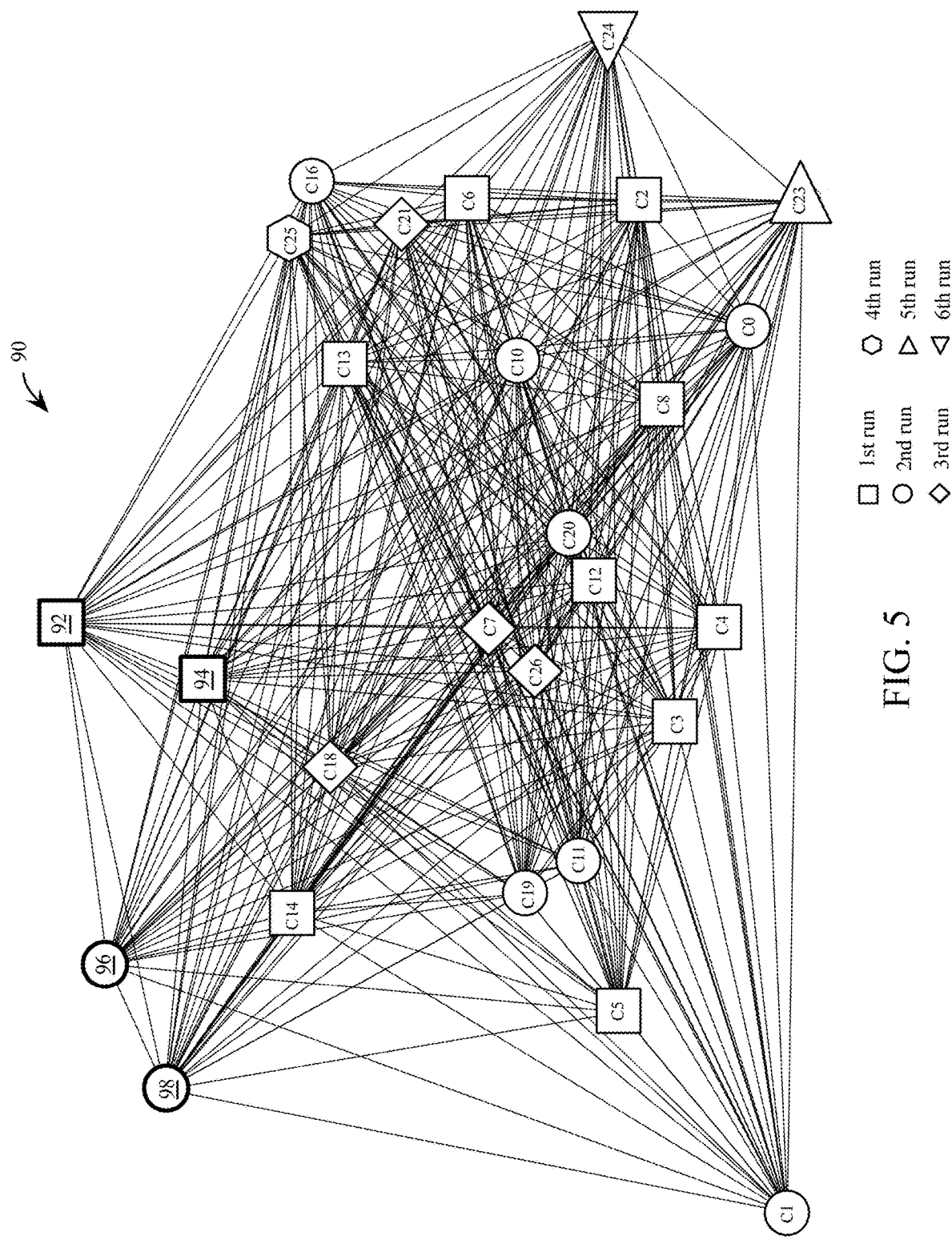
FIG. 5 is a graphical representation of a distance graph including the nodes of FIG. 4, where the nodes are connected to each other with connecting lines having a distance defined by at least the physical distance between each node.

FIG. 5 is a graphical representation of a distance graph 90 including the nodes representing all of the BIST controllers with respective memory groups. Each node is connected to another node with a line having a distance defined by at least the physical distance between these two nodes. Each node is also labelled with BIST labels C0 through C26 as previously shown in FIG. 2 and FIG. 3. Similar to FIG. 4, the shape of each node denotes the order in which the BIST is run. For example, a square enclosure is run first, a circular enclosure is run second, a diamond enclosure is run third, a hexagonal enclosure is run fourth, a triangular enclosure pointing to the right is run fifth and a triangular enclosure pointing to the left is run sixth. In FIG. 5, two nodes 92 and 94 are physically close to each other, with both scheduled to run first (e.g., square enclosure). The two nodes 96 and 98 are also physically close to each other and both scheduled to run second (e.g., circular enclosure). This represents an unoptimized condition that may lead to peak power and IR drop issues.

Figure 6:
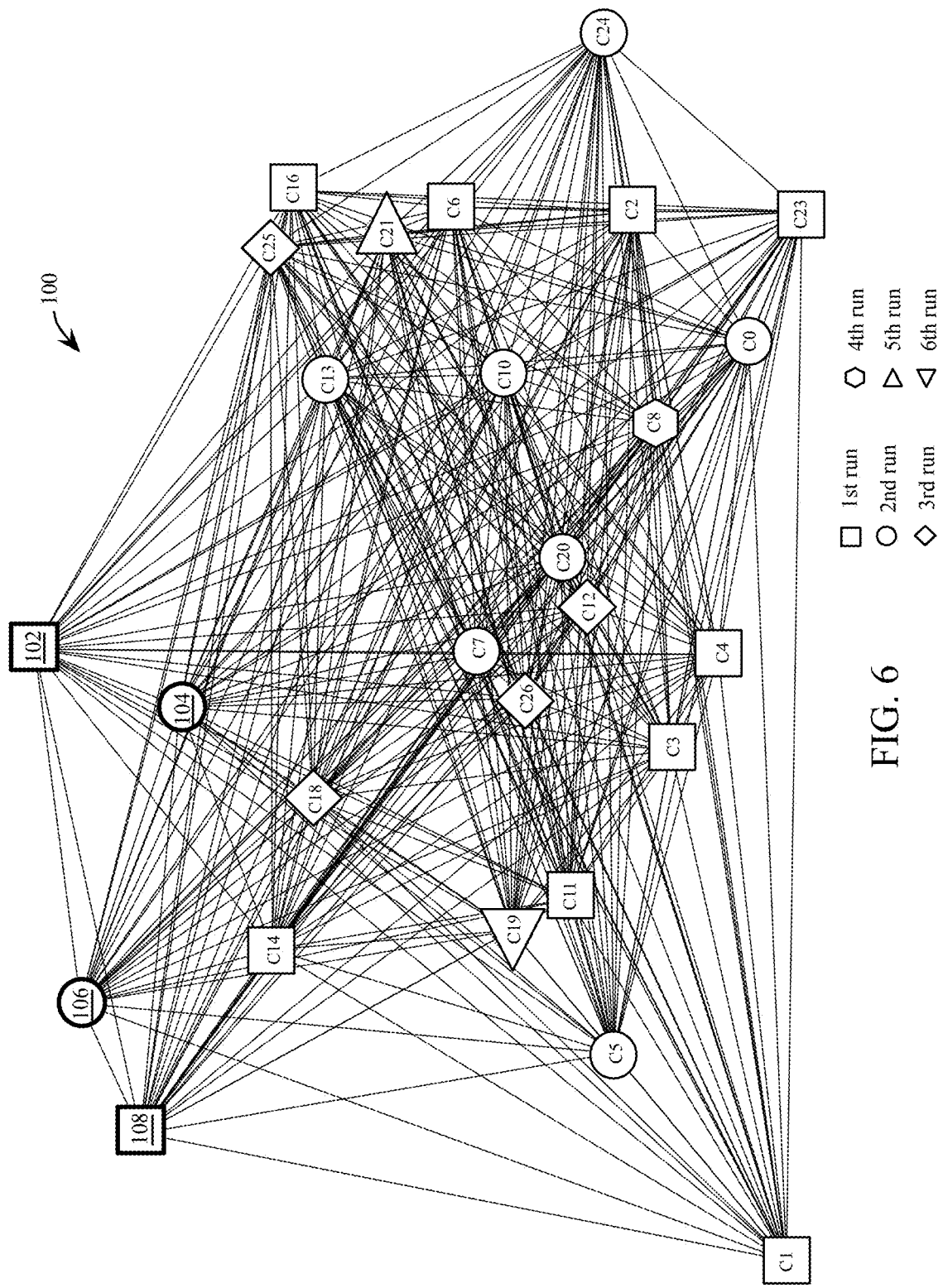
FIG. 6 is a graphical representation of the distance graph of FIG. 5 with a reordered test sequencing of nodes for power profile optimization.

FIG. 6, with continued reference to FIG. 5 shows an optimized distance graph 100. The scheduling order of many of the nodes is shown to be reordered on a global basis to maximize the distance between each pair of nodes that have the same scheduling (e.g., parallel execution of test sequences). In one non-limiting example, the determination of optimized start times for test sequences is performed with a greedy search algorithm, seeking to find an optimal solution for all BIST controllers and respective memories together, rather than seeking optimal reordering of start times for each pair of nodes in isolation from other nodes. With reference to FIG. 6 and continued reference to FIG. 5, the nodes 92 and 94 are reordered as nodes 102 and 104 respectively. In FIG. 6, node 102 now runs first and node 104 is scheduled to run second. Thus physically proximate nodes 102 and 104 no longer run concurrently. Similarly, node 106 (formerly 96) now runs second and node 108 (formerly 98) is scheduled to run first. Thus physically proximate nodes 106 and 108 no longer run concurrently.

Figure 7:
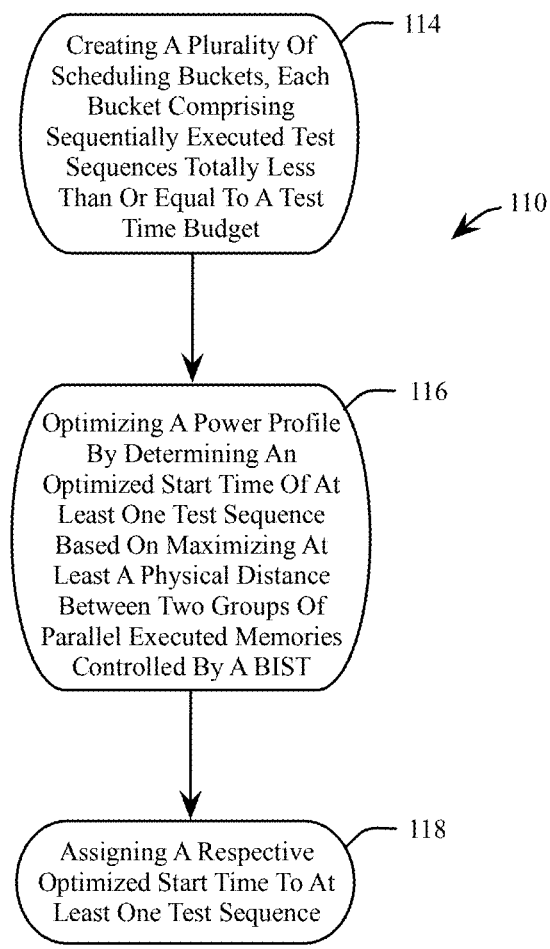
FIG. 7 is a flowchart representation of another method for physical-aware power profile optimization during memory test, in accordance with an embodiment of the present disclosure.

FIG. 7 shows an embodiment 110 of a method for physical-aware power profile optimization during memory test. With continued reference to FIG. 2, FIG. 3 and FIG. 7, at 114, a plurality of scheduling buckets 40 are created, where each bucket comprises sequentially executed test sequences (e.g. 42 and 44 of bucket 40*e*), totaling less than a test time budget 30. At 116, a power profile is optimized by determining an optimized start time of at least one test sequence based on at least maximizing a physical distance between two groups of parallel executed memories. Other physical factors may also be considered during the optimization as listed in the physical information 14 for FIG. 1. At 118, the respective optimized start times are assigned to the at least one test sequence.

Figure 8:
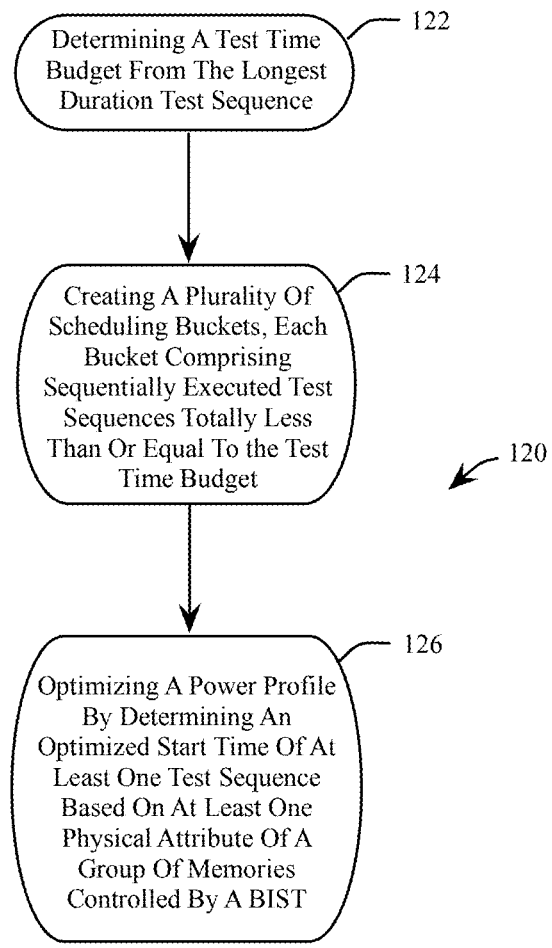
FIG. 8 is a flowchart representation of another method for physical-aware power profile optimization during memory test, in accordance with an embodiment of the present disclosure.

FIG. 8 shows an embodiment 120 of a method for physical-aware power profile optimization during memory test. With continued reference to FIG. 2, FIG. 3 and FIG. 8, at 122 a test time budget 30 is determined from the longest duration test sequence. At 124, a plurality of scheduling buckets 40 is created, where each bucket comprises sequentially executed test sequences (e.g. 42 and 44 of bucket 40*e*), totaling less than the test time budget 30. At 126, a power profile is optimized by determining an optimized start time of at least one test sequence based on at least one physical attribute of two groups of parallel executed memories. Other physical factors may also be considered during the optimization as listed in the physical information 14 for FIG. 1.

As will be appreciated, at least some of the embodiments as disclosed include at least the following. In one embodiment, a method for physical-aware power profile optimization during memory test comprises creating a plurality of scheduling buckets, wherein each scheduling bucket comprises one or more sequentially executed test sequences, each test sequence controlled by a respective Built-In Self-Test (BIST) controller, each test sequence comprising a respective unoptimized start time and a respective execution time, and a respective combined duration of the execution times of each respective scheduling bucket being less than or equal to a test time budget. A power profile is optimized by determining a respective optimized start time of at least one test sequence from at least a physical distance between two groups of memories controlled by respective BIST controllers. The respective optimized start time is assigned to at least one test sequence.

Alternative embodiments of the method for physical-aware power profile optimization during memory test include one of the following features, or any combination thereof. The test time budget is equated to the execution time of the test sequence comprising the longest execution time. The execution time of each test sequence is determined from at least one logical attribute of the respective group of memories. The logical attributes comprise a configuration of the respective BIST controller, a first number of read ports, a second number of write ports, a third number of words, a data width of each word, a write access speed, a read access speed, an estimated power consumption and a test pattern algorithm. The plurality of scheduling buckets are created with a bin packing algorithm. The bin packing algorithm is implemented with a dynamic programming approach. The physical distance between two groups of memories is determined by averaging a respective centroid of each memory comprising the group of memories. The centroid of each memory is scaled by a weight factor determined by the physical size of the respective memory. Optimizing the power profile is determined from at least one physical attribute of the respective group of memories, where the physical attributes comprise a physical die area of a System on a Chip embodying the group of memories, a physical height of each memory, a physical width of each memory, a location of each memory, an orientation of each memory, a location of each BIST and a energy required for each memory access. Optimizing the power profile comprises maximizing an average distance between each pair of BIST controllers comprising at least one of the respective group of memories concurrently executing a test sequence. Maximizing the average distance is determined by a greedy search algorithm.

In another embodiment, an apparatus comprises a plurality of Built-In Self-Test (BIST) controllers. A respective group of memory devices is coupled to each BIST controller. A first circuit is configured to determine a test time budget from one of a plurality of test sequences comprising the longest execution time. A second circuit is configured to create a plurality of scheduling buckets, wherein each scheduling bucket comprises one or more sequentially executed test sequences, each test sequence controlled by a respective Built-In Self-Test (BIST) controller, each test sequence comprising a respective unoptimized start time and a respective execution time, and a respective combined duration of the execution times of each respective scheduling bucket being less than or equal to the test time budget. A third circuit is configured to optimize a power profile by determining a respective optimized start time of at least one test sequence from at least one physical attribute of the respective group of memories controlled by the respective BIST controller.

Alternative embodiments of the apparatus include one of the following features, or any combination thereof. The at least one physical attribute comprises a respective centroid and a respective physical size of each memory of the respective group of memories, and optimizing the power profile comprises maximizing an average distance between each pair of BIST controllers comprising at least one of the respective group of memories concurrently executing a test sequence. The BIST controllers and the respective group of memory devices are embodied in a System on a Chip and are tested with a production tester. The BIST controllers and the respective group of memory devices are embodied in a System on a Chip and are self-tested in the field.

In another embodiment, a method for physical-aware power profile optimization during memory test comprises determining a test time budget from one of a plurality of test sequences comprising the longest execution time. A plurality of scheduling buckets are created, wherein each scheduling bucket comprises a serially arranged one or more of the test sequences, each test sequence controlled by a respective Built-In Self-Test (BIST) controller, each test sequence comprising a respective unoptimized start time and a respective execution time, and a respective combined duration of the execution times of each respective scheduling bucket being less than or equal to the test time budget. A power profile is optimized by determining a respective optimized start time of at least one test sequence from at least one physical attribute of the respective group of memories controlled by the respective BIST controller.

Alternative embodiments of the method for physical-aware power profile optimization during memory test include one of the following features, or any combination thereof. At least one physical attribute comprises a respective centroid and a respective physical size of each memory of the respective group of memories. Optimizing the power profile comprises maximizing an average distance between each pair of BIST controllers comprising at least one of the respective group of memories concurrently executing a test sequence. A distance graph is generated with a plurality of nodes, wherein each node represents a BIST controller with a respective group of memories, and the nodes are separated by connecting lines with a length proportional to at least an average distance between the respective group of memories of two nodes. An improvement to the power profile is modeled by comparing a distribution of memory accesses plotted over a time frame spanning the test time budget for all BISTs using the unoptimized start times and using the optimized start times.

Although the invention is described herein with reference to specific embodiments, various modifications and changes can be made without departing from the scope of the present invention as set forth in the claims below. Accordingly, the specification and figures are to be regarded in an illustrative rather than a restrictive sense, and all such modifications are intended to be included within the scope of the present invention. Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements.

What is claimed is:

1. A method for physical-aware power profile optimization during memory test comprising:
   creating a plurality of scheduling buckets, wherein each scheduling comprises one or more sequentially executed test sequences, each bucket test sequence controlled by a respective Built-In Self-Test (BIST) controller, each test sequence comprising a respective unoptimized start time and a respective execution time, and a respective combined duration of the execution times of each respective scheduling bucket being less than or equal to a test time budget;
   optimizing a power profile by determining a respective optimized start time of at least one test sequence from at least a physical distance between two groups of memories controlled by respective BIST controllers; and
   assigning the respective optimized start time to the at least one test sequence.

2. The method of claim 1 further comprising equating the test time budget to the execution time of the test sequence comprising a longest execution time.

3. The method of claim 2 wherein the execution time of each test sequence is determined from at least one logical attribute of a respective group of memories.

4. The method of claim 3 wherein the logical attributes comprise a configuration of the respective BIST controller, a first number of read ports, a second number of write ports, a third number of words, a data width of each word, a write access speed, a read access speed, an estimated power consumption, and a test pattern algorithm.

5. The method of claim 1 wherein the plurality of scheduling buckets are created with a bin packing algorithm.

6. The method of claim 5 wherein the bin packing algorithm is implemented with a dynamic programming approach.

7. The method of claim 1 wherein the physical distance between two groups of memories is determined by averaging a respective centroid of each memory.

8. The method of claim 7 wherein the centroid of each memory is scaled by a weight factor determined by a physical memory size.

9. The method of claim 1 wherein optimizing the power profile is determined from at least one physical attribute of a respective group of memories, where the physical attributes comprise a physical die area of a System on a Chip embodying a group of memories, a physical height of each memory, a physical width of each memory, a location of each memory, an orientation of each memory, a location of each BIST and a energy required for each memory access.

10. The method of claim 1 wherein optimizing the power profile comprises maximizing an average distance between each pair of BIST controllers comprising at least one of a respective group of memories concurrently executing a test sequence.

11. The method of claim 10 wherein maximizing the average distance is determined by a greedy search algorithm.

12. An apparatus comprising:
    a plurality of Built-In Self-Test (BIST) controllers;
    a respective group of memories coupled to each BIST controller;
    a first circuit configured to determine a test time budget from one of a plurality of test sequences comprising a longest execution time;
    a second circuit configured to create a plurality of scheduling buckets, wherein each scheduling bucket comprises one or more sequentially executed test sequences, each test sequence controlled by a respective Built-In Self-Test (BIST) controller, each test sequence comprising a respective unoptimized start time and a respective execution time, and a respective combined duration of the execution times of each respective scheduling bucket being less than or equal to the test time budget; and
    a third circuit configured to optimize a power profile by determining a respective optimized start time of at least one test sequence from at least one physical attribute, the at least one physical attribute including a physical distance between two groups of memories controlled by respective BIST controllers.

13. The apparatus of claim 12 wherein the at least one physical attribute comprises a respective centroid and a respective physical size of each memory of the respective group of memories, and optimizing the power profile comprises maximizing an average distance between each pair of BIST controllers comprising at least one of the respective group of memories concurrently executing a test sequence.

14. The apparatus of claim 12 wherein the BIST controllers and the respective group of memory devices are embodied in a System on a Chip and are tested with a production tester.

15. The apparatus of claim 12 wherein the BIST controllers and the respective group of memory devices are embodied in a System on a Chip and are self-tested in a field test.

16. A method for physical-aware power profile optimization during memory test comprising:
    determining a test time budget from one of a plurality of test sequences comprising a longest execution time;
    creating a plurality of scheduling buckets, wherein each scheduling bucket comprises a serially arranged one or more of the test sequences, each test sequence controlled by a respective Built-In Self-Test (BIST) controller, each test sequence comprising a respective unoptimized start time and a respective execution time, and a respective combined duration of the execution times of each respective scheduling bucket being less than or equal to the test time budget; and optimizing a power profile by determining a respective optimized start time of at least one test sequence from at least one physical attribute, the at least one physical attribute including a physical distance between two groups of memories controlled by respective BIST controllers.

17. The method of claim 16 wherein the at least one physical attribute comprises a respective centroid and a respective physical size of each memory of a respective group of memories.

18. The method of claim 16 wherein optimizing the power profile comprises maximizing an average distance between each pair of BIST controllers comprising at least one of a respective group of memories concurrently executing a test sequence.

19. The method of claim 16 further comprising generating a distance graph with a plurality of nodes, wherein each node represents a BIST controller with a respective group of memories, and the nodes are separated by connecting lines with a length proportional to at least an average distance between the respective group of memories of two nodes.

20. The method of claim 16 further comprising modelling an improvement to the power profile by comparing a distribution of memory accesses plotted over a time frame spanning the test time budget for all BISTs using the unoptimized start times and using the optimized start times.

* * * * *